United States Patent Office 3,062,112
Patented Nov. 6, 1962

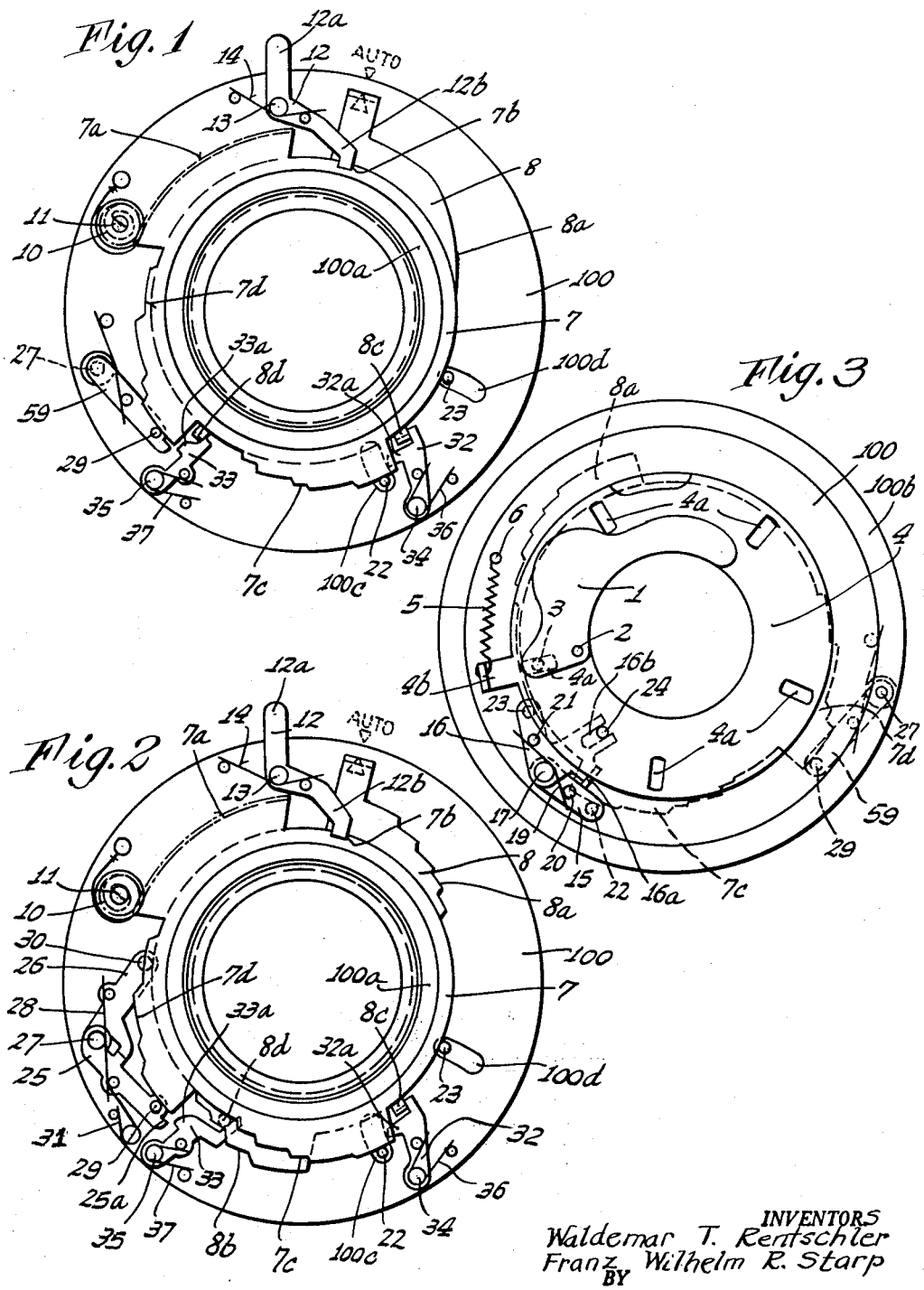

3,062,112
PHOTOGRAPHIC CAMERA
Waldemar T. Rentschler and Franz Wilhelm R. Starp, Calmbach (Enz), Germany, assignors to Alfred Gauthier G.m.b.H., Calmbach (Enz), Germany, a corporation of Germany
Filed Mar. 23, 1960, Ser. No. 17,209
Claims priority, application Germany Mar. 25, 1959
5 Claims. (Cl. 95—10)

This invention relates to photographic cameras of the type having diaphragm aperture and shutter speed adjusting mechanisms which are regulated by a common setting member the range of which has uniform exposure value gradations.

An object of the present invention is to provide a novel and improved photographic camera of the above type, wherein the exposure setting can be selectively effected either automatically in response to operation of a light intensity measuring device or else manually without regard to such measuring device, while at the same time attaining an optimal simplicity and a free flexible mobility with respect to the structures involved and the mode of operation of such structures together with the method of setting or adjusting the camera, and wherein more particularly the change from automatic to non-automatic or manual exposure setting may be effected without imposing any special requirements or restrictions whatsoever on the construction and mode of operation of the light intensity measuring device, said change-over being possible for any setting position of the measuring device, by means of a single setting operation.

The above object is accomplished, in accordance with the invention, by the provision of novel tensional, unidirectionally-positive driving connection means between the adjusting mechanisms for the diaphragm aperture and the shutter speed on the one hand, and manually adjustable and automatically adjustable setting devices on the other hand, the organization being characterized by a control means which is responsive to movement of a switching or selector means from an "automatic" to a "non-automatic" or manual position which latter effects a disconnection of one of the setting devices from the diaphragm and speed adjusting mechanisms while the other setting device remains operative to actuate the said mechanisms.

The special advantages found in a camera constructed in accordance with the invention, reside more particularly in the fact that it is possible to obtain a selective setting of the shutter speed and diaphragm aperture either automatically in response to operation of a light intensity measuring device or else manually, without requiring any substantial additional cost and without interfering with the structure and mode of operation of the automatic light responsive control device. Rather, by the provision of tensional, uni-directionally-positive driving connection means between the diaphragm and speed adjusting mechanisms and a special manually operable setting member which also constitutes a selector means that is movable between automatic and non-automatic or manual positions it is possible to readily switch the camera to the desired kind of setting but merely a single setting operation, and independently of the prevailing adjusted position of the light intensity measuring device.

The accompanying drawing and description which follow explain two embodiments of the invention, showing these in detail and setting forth the special advantages which are obtained thereby.

FIGURE 1 is a rear elevational view of members or components of an exposure setting device as constructed in accordance with the invention, said components being arranged at the rear of an intra-lens shutter assemblage which is attachable to a photographic camera. The components are shown in the positions which they assume when the camera is set for effecting an automatic exposure setting.

FIG. 2 is a view similar to that of FIG. 1, but showing another embodiment of the invention wherein the exposure setting device is further developed.

FIG. 3 is a first elevational view of components and associated structure comprising the exposure setting device as provided by the invention, there being illustrated in this figure an iris type diaphragm incorporated in the rear portion of the shutter housing. The organization illustrated in FIG. 3 is usable with the structures of both FIGS. 1 and 2.

Figure 4:
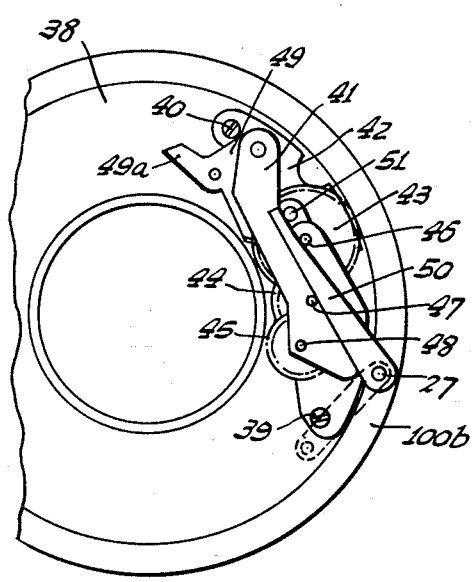
FIG. 4 is a fragmentary front elevational view of the shutter speed adjusting mechanism provided within the intra-lens shutter assemblage, as utilized with the exposure setting structures of FIGS. 1, 2 and 3.

Referring to the figures, the numeral 100 indicates the housing of a photographic intra-lens shutter assemblage. A tubular connection or supporting means 100a is provided at the rear of the shutter assemblage in a well known manner, and is used for receiving lenses of the camera objective and for attaching the shutter assemblage to the camera. In the rear portion of the shutter housing 100 there is provided an iris type diaphragm having segments or lamellas only one of which is shown and indicated at 1 for the sake of clarity of illustration.

As seen in FIG. 3 the diaphragm segments 1 are pivotally mounted in a well known manner on pins 2 carried by a fixed bearing plate (not shown), and have pin-and-slot connections 3, 4a with a turnable actuating ring 4. To operate the ring 4 there is provided a helical extension spring 5 which is at one end affixed to an arm 4b of the ring 4, the other end of the spring 5 being attached to a stationary pin 6. The spring 5 imparts a clockwise bias to the actuating ring 4, and tends to shift the diaphragm segments 1 to the positions corresponding to the smallest diaphragm aperture.

In accordance with present invention, the diaphragm aperture adjusting mechanism together with the shutter speed adjusting mechanism (which latter will be described later) are selectively connected, by means of tensional uni-directionally-positive driving connection means either to an automatically adjusted setting device adapted to be controlled by a light intensity measuring device or else to a manually operable setting device. The portions of the said adjusting mechanisms which cooperate with the automatically movable setting device are shifted, in response to movement adjustment of a switching or selector means from an automatic position to a manual or non-automatic position, to inoperative positions in which the said portions are no longer influenced by the automatically movable setting device.

In the illustrated embodiments of the invention the automatically movable setting device and the manually operable setting device are constituted as rings 7 and 8 respectively, which are positioned on the rear wall of the shutter housing so as to be rotatable about the tubular connection 100a. The automatically movable setting ring 7 is associated with a power driving means in the form of a spiral spring 10 which is connected to a spindle 11 carrying a pinion meshing with a toothed segment 7a provided on the setting ring 7. In FIGS. 1 and 2 the setting ring 7 is shown in its cocked position, associated with a loaded or stressed condition of the driving spring 10. The ring 7 is locked in this cocked position by means of a latching lever 12, which is pivotally carried by a pivot pin 13 on the rear wall of the shutter housing and which has a finger piece 12a and also a detent arm 12b which latter is received under the action of a spring 14 in an opening or recess 7b of the setting ring 7 when such ring is in the cocked or stressed position. The pivoting movement of the latching lever 12 for the purpose of releasing the cocked setting ring 7, as well as the stressing of the driving spring 10 for the ring 7 can be effected in response to actuation of the camera or shutter release and the advance of the film transport device of the camera, respectively.

The driving shaft 11 serves, in the illustrated embodiments of the invention, to connect the automatically movable setting device 7 to a well-known light intensity measuring device (not shown for the sake of clarity of illustration) and for this purpose the pinion which meshes with the segment 7a of the ring 7 is affixed to the end of the driving shaft.

Devices providing for the automatic setting or adjustment of a setting device in response to operation of a light intensity measuring device are well known, and the invention does not relate to them per se. One such device may, for example, be constructed for use with the illustrated embodiment of the invention, in such a manner that the shaft 11 serves to move or advance a sensing (contact or feeling-out) member which is adapted to have abutting engagement with a deflectable stop or needle of the movable portion of the light intensity measuring device.

As is apparent from FIGS. 1 and 2, the automatically movable setting ring 7 has two cams 7c and 7d. The cam 7c serves to influence or actuate the actuating ring 4 for the diaphragm segments, and the cam 7d serves to influence or actuate an adjusting mechanism (to be described in detail below) for adjusting or setting the shutter speed, when the camera settings are to be automatically regulated. The cams 7c and 7d are constructed in such a manner that the adjustment range of the automatically movable setting ring 7 follows an exposure value range which has uniform gradations.

The manually operable setting ring 8, in the illustrated embodiment of the invention shown in FIG. 2 also has two cams 8a and 8b, which influence or actuate the diaphragm aperture and shutter speed adjusting mechanisms when the camera is set for non-automatic or manual exposure setting.

The invention further provides pivotally mounted levers arranged to connect the automatically movable setting ring 7 and the manually operable setting ring 8 to the diaphragm aperture and shutter speed adjusting mechanisms, said levers being pivotally movable about fixed axes and being spring-urged or biased for purposes described in detail below. As is apparent from FIG. 3, the diaphragm adjusting mechanism is associated with two levers 15 and 16 which are pivotally mounted on a common, fixed axis or pin 17 provided on the inside of the rear wall of the shutter housing. A spring 19 is provided, extending about the pin 17 and at its ends engaging pins 20 and 21 of the levers, said spring tending to maintain the lever 15 in engagement with a stop lug 16a of the lever 16. The levers 15 and 16 are cooperable with the aforementioned cams 7c and 8a of the setting rings 7 and 8, and for this purpose the levers have pins 22 and 23 which pass through clearance slots 100c and 100d provided in the rear wall of the shutter housing. Also, the lever 16, which has a pin-and-slot connection 16b, 24 with the diaphragm actuating ring 4, cooperates with the manually operable setting ring 8.

In the embodiment of the invention illustrated in FIG. 2 there are two levers 25 and 26 which are arranged to connect the setting rings 7 and 8 to the shutter speed adjusting mechanism of the camera.

The levers 25 and 26 have a common bearing axle 27 fixedly carried in a bore of the side wall 100b of the shutter housing. The levers 25 and 26 are biased by a spring 28 which tends to keep such levers in abutting engagement with each other, and have pins 29 and 30 constituting cam followers which are engageable with the cams 7d and 8b respectively of the setting rings 7 and 8. The lever 25 which is associated with the automatically movable setting device 7 is acted on by a spring 31, which tends to keep it in engagement with the said ring.

In accordance with the invention, the levers 15 and 25 of the two pairs of levers which are provided, and which are associated with the automatically movable setting device, are pivoted or shifted to inoperative positions in response to movement of a switching or selector means from automatic to non-automatic or manual position, whereby they are not influenced or actuated by the said setting device.

The switching or selector means, in the illustrated embodiment of the invention, is constituted as the manually operable setting member 8. By such organization there is effected a saving of parts and a reduction in cost, while at the same time the operation of the camera is simplified. The selector means comprising the member 8 may, for the purpose of switching the camera to either the automatic or the manual setting, be positionable into an "automatic" position as shown in FIGS. 1 and 2 and also into a plurality of manual setting positions which will be described in detail below.

The control influence of the automatically movable setting device 7 on the levers 15 and 25 is eliminated in a simple and functionally dependable manner by means of locking devices which are under the control of the same ring and which hold the levers 15 and 25 in the said shifted, inoperative positions.

The locking devices comprise levers or pawls 32 and 33, which are pivotally carried by pivots 34 and 35 respectively located on the rear wall of the shutter housing. The pawls 32 and 33 are biased each in a counter clockwise direction by springs 36 and 37, respectively. In addition, the pawls 32 and 33 have lugs 32a and 33a by means of which the pawls cooperate respectively with a pin 22 of the lever 15 and a projection 25a of the lever 25.

For the purpose of controlling the pawls 32 and 33, the selector means comprising the setting ring 8 has two projections 8c and 8d, which are engageable with the pawls to pivotally shift the same into inoperative positions against the action of their springs when the setting ring 8 is moved to the automatic position. When the ring 8 is shifted from the automatic position shown in FIGS. 1 and 2 into a setting position associated with the non-automatic or manual regulation of the camera, the pawls 32 and 33 are released or disengaged to become operative under the action of their respective springs, for the purpose of retaining the levers 15 and 25 in inoperative positions wherein the controlling influence of the automatically movable setting device 7 on the levers is eliminated.

For the purpose of obtaining different shutter speeds, the camera as illustrated in the figures has a well-known type of escapement gear mechanism (FIG. 4) which is secured to a base plate 38 carrying the shutter mechanism, by means of screws 39 and 40.

The escapement mechanism comprises top and bottom bearing plates 41 and 42, between which gears 43, 44 and 45 of the mechanism are positioned on spindles 46, 37 and 48, respectively. The escapement mechanism further comprises, for the purpose of driving the gears 46 to 48, a retarding lever constituted as a toothed segment 49 having a projection 49a which is engageable in a well-known manner with the main driving member of the shutter (the latter not being shown in the drawings for the sake of clarity of illustration).

Figure 5:
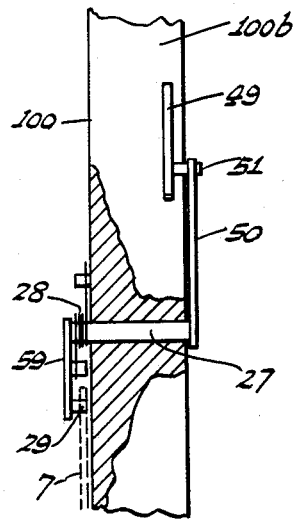
FIG. 5 is a detail, partly in elevation and partly in section, of the shutter speed control levers shown in FIG. 4, the section being through the side wall of the shutter housing.

The adjustable positioning of the toothed segment 49 is effected in response to adjustment of the automatically movable setting ring 7 or of the manually operable setting ring 8. For this purpose, a one-armed lever 50 is affixed to the bearing spindle 27 provided for the levers 25 and 26. The lever 50 is engageable with a pin 51 provided on the toothed segment 49, in the manner shown in FIGS. 4 and 5. The connection of the levers 25 and 26 to the bearing spindle 27 is effected (see FIG. 2) in such a manner that the lever 26 cooperating with the selector ring 8 is fixedly attached to the spindle whereas the lever 25 which is actuated by the automatically movable setting ring 7 is loosely carried by the spindle.

The camera is constructed in accordance with the invention and described above, operates and functions in the following manner:

*(1) Effecting a Photograph With Automatic Exposure Setting*

For this purpose, the automatically movable setting ring 7 and the selector means including the manually operable setting ring 8 initially occupy the positions shown in FIGS. 1 and 2, wherein the driving device 10, 11 is stressed or loaded, and the automatic exposure mechanism of the camera is in readiness for operation. Pivoting of the release lever 12 in a counter-clockwise direction releases the powered setting ring 7, enabling the latter to run down in a counterclockwise direction under the action of the spring 10. As determined by existing light conditions, the setting ring 7 will travel to a greater or lesser extent, and will be halted in a position which is indicative of the intensity of the light, such action being effected by engagement between the sensing member connected to the ring 7 and the movable or deflectable member of the light intensity measuring device. The two pairs of levers 15, 16 and 25, 26 provided respectively for adjustment of the diaphragm and shutter speed now pivotally move respectively in clockwise and counterclockwise directions under the action of the respective springs 5 and 31, while the setting ring 7 is running down. Such levers are under the control of the cams 7c and 7d of the ring 7, as will be understood. The pivotal movement of the pair of levers 15, 16 is transmitted to the diaphragm actuating ring 4 by the lever 16, while the pivotal movement of the pair of levers 25, 26 is transmitted to the retarding lever 49 of the speed escapement mechanism by means of the spindle 27 and the lever 25. This mode of operation has the effect of automatically correctly setting the diaphragm aperture and the shutter speed values in accordance with the prevailing light intensity.

Considering for example a diaphragm setting range of from 2.8 to 22 and a shutter speed setting range of from 1/30 sec. to 2/250 sec., the correlation of the speed and diaphragm values for obtaining a setting range of the automatically movable setting ring 7 which provides for uniform exposure value gradations may, for example, be effected in accordance with the following table:

| Exposure time: | Diaphragm |
|---|---|
| 30 | 2.8 |
| 60 | 2.8 |
| 60 | 4 |
| 60 | 5.6 |
| 125 | 5.6 |
| 125 | 8 |
| 125 | 11 |
| 250 | 11 |
| 250 | 16 |
| 250 | 22 |

The above correlation of speed and diaphragm values results in a uniformly gradated exposure value series comprising the values 8 to 17.

In order to make sure that the automatic exposure setting is effected prior to actual opening of the shutter, a well-known escapement mechanism may be provided, said mechanism being released or rendered operative in response to or simultaneously with the release of the camera or shutter. By such mechanism the start of release of the shutter or shutter opening can be delayed by a specific period of time with respect to the actuation of the camera release or shutter release member, said period of time being sufficiently great to enable the setting device which is controlled by the light intensity measuring device to travel the maximum extent of movement possible, before the shutter blades being to open.

*(2) Effecting a Photograph With Manual Exposure Settings*

For this purpose, the selector and manually operable setting ring 8 is shifted from the "automatic" position in a clockwise direction, to any one of a number of different manually effected positions. Such movement of the ring 8 first effects a release of the locking pawls 32 and 33 by the projections 8c and 8d, thereby rendering the pawls operative. The pawls 32 and 33 in consequence are brought into engagement under the action of their springs 36 and 37 with the pivotal levers 15 and 25 associated with the automatically movable setting ring 7, so as to retain the levers 15 and 25 in the positions corresponding to the largest diaphragm aperture or the smallest shutter speed (longest exposure time).

In order to effect a manual setting of the exposure time the setting ring 8 has the aforementioned cams 8a and 8b. The cam 8a effects an adjustment of the diaphragm aperture, and for this purpose it cooperates with the pin 23 of the lever 16 (which lever is connected to the diaphragm actuating ring 4). The cam 8b is adapted to cooperate with the lever 26 which is fixedly secured to the adjusting lever 50 through the medium of the shaft 27, the lever 50 constituting a portion of the shutter speed adjusting mechanism, herein illustrated as an escapement.

Whereas in the case of an automatic exposure setting of the camera the pairs of levers 15, 16 and 25, 26 were pivoted as a unit by means of the cams 7c and 7d of the ring 7, when a manually controlled setting is employed the levers 15 and 25 associated with the automatically movable setting ring 7 are locked in their extended, inoperative positions of FIG. 2. Consequently, when the camera setting is to be effected manually as by shifting the selector ring 8 clockwise from the positions shown in FIGS. 1 and 2, only the levers 16 and 26 are actuated, this being accomplished by the cams 8a and 8b.

The correlation of the shutter speed and diaphragm aperture values which are settable by means of the selector and manual setting ring 8 can be effected in various ways. More particularly, the said selector and setting ring may have several setting ranges associated with different kinds of exposures which are to be manually effected.

Figure 6:
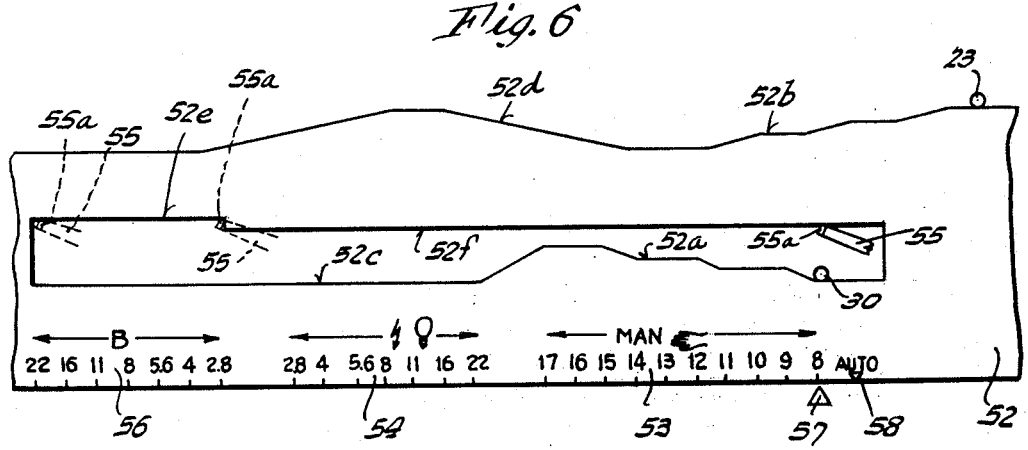
FIG. 6 is a diagrammatic representation of a manually operable setting member constituting a portion of the exposure setting device as provided by the invention. This setting member may be utilized with the embodiment of the invention of FIG. 2, and the member is drawn in the form of a slide for the sake of clarity of illustration.

FIG. 6 illustrates a selector and manual exposure setting member constituted in such a manner. As is apparent from this figure, the setting member is constructed in the form of a slide 52, and has three setting ranges. A first range is defined by an exposure value scale 53 comprising the values 8–17 as effected by the table above set forth, and identified by the word "man" together with a symbol depicting a hand. The cams 52a and 52b provided on this member serve for setting the speed-diaphragm value pairs corresponding to the exposure values of the scale 53. The cam 52a is cooperable with the cam follower pin 30 of the lever 26, whereas the cam 52b is cooperable with the cam follower pin 23 of the lever 16.

The provision of the above setting ranges on the manually operable setting member 52 or 8 makes it possible to use the camera for obtaining entirely satisfactory pictures, even when the automatic exposure setting device breaks down or is for one reason or another rendered inoperative.

A second setting range provided on the part 52 is adapted for flash exposure use. For the purpose of carrying out flash exposures, the entire diaphragm adjusting range is associated, in this flash range, with a single exposure time or shutter speed, as for example 1/30 sec. This flash exposure range is characterized by a diaphragm scale 54 and stylized pictures of an electronic flash and a combustion flash lamp. The cams which are provided for the shutter speed and the diaphragm in connection with the flash exposure range have been given the reference numerals 52c and 52d.

In addition, a well known device for taking B-photographs can be controlled by means of the slide-type setting member 52. For reasons of clarity of illustration, this device is shown in the illustrated embodiment of the invention merely as a control lever 55 which has a bent-off end portion 55a which engages under the action of a spring (not shown), a B-cam provided on the slide 52. The B-cam has two partial ranges or regions 52e and 52f. When the slide 52 is in its setting position wherein the lever engages the partial region 52e of the cam, the B-device is in its operative position, i.e., the position which effects a retention of the shutter in the open position (for a period of time determined by the length of time during which the shutter release member is held depressed) after the shutter has been initially released and opened.

However, if the slide 52 is in its setting position wherein the lever 55 engages the partial region 52f of the cam, the B-device is made inoperative. The partial region 52e of the B-cam is associated with a partial setting range of the slide 52 which is designated "B" and which comprises the entire diaphragm adjustment range between the aperture values of 2/8 and 22. This makes it possible, when taking B-photographs, to change the depth of focus by an appropriate selection or adjustment of the diaphragm aperture, thereby insuring the best possible adaptability of the exposure setting to the subject which is being photographed.

A stationary setting mark 57 cooperates with the scales 53 and 54 as well as with a diaphragm scale 56 provided for B-exposures, for the purpose of correctly setting the slide 52. The slide 52 also has a setting mark 58, designated "auto" for the purpose of placing the slide in its setting which effects automatic exposure regulation of the camera.

The above described construction of selector device and manually operable exposure setting member is adapted for use in the arrangement set forth in FIG. 2, wherein two pivotal levers are associated both with the diaphragm adjusting mechanism and also with the shutter speed adjusting mechanism. In the embodiment of the invention illustrated in FIG. 1, on the other hand, only a single pivotal lever 59 corresponding to the lever 25 in FIG. 2 is provided for effecting the shutter speed setting. The lever 59 is fixedly connected to the adjusting lever 50 associated with the exposure time (speed) escapement mechanism, by means of the spindle 27, and the lever 59 cooperates with the cam 7d of the automatically movable setting member 7, and also with the pawl 33. Consequently, only a single shutter speed, as for example 1/30 sec., is available in the case of a manual exposure setting. A setting device constructed in this manner does not offer the possibility of associating specific diaphragm values with shutter speeds of different magnitudes, in a fixed predetermined mannerr esulting in an exposure value with uniform gradations.

We claim:

1. In a photographic camera of the type having diaphragm aperture and shutter speed adjusting mechanisms which are regulated by a common setting member the range of which has uniform exposure value gradations, in combination, an automatically adjusted first setting device adapted to be controlled by a light-intensity measuring device; a manually operable second setting device; first tensional, unidirectionally positive driving connection means for connecting the speed adjusting mechanism selectively with either the said first or second setting devices to be actuated thereby; second tensional, unidirectionally positive driving connection means for connecting the diaphragm adjusting mechanism with the first and second setting devices for selective actuation thereby; selector means movable between "automatic" and "manual" positions; and control means responsive to movement of the selector means to "manual" position, acting on said first and second driving connection means to disconnect the first setting device from the diaphragm and speed adjusting mechanisms while the second setting device remains operative to actuate the said mechanisms.

2. The invention as defined in claim 1, in which the first and second driving connecting means comprise respectively pairs of levers, each pair being pivotal about a fixed axis and the levers of each pair being pivotally movable into abutting relation with each other and having spring means tending to maintain such abutting relation, said first setting device having cam means cooperable with a single lever of each pair and said single levers being held out of cooperable relationship with said cam means by said control means when the selector means is moved to "manual" position, said second setting device having cam means cooperable with the remaining levers of the pairs, for actuating the said remaining levers when the selector means is in the "manual" position.

3. The invention as defined in claim 1, in which one of the driving connection means comprises two levers pivotal about a fixed axis, said levers being movable into abutting relation with each other and having spring means tending to maintain such abutting relation, said first setting device having cam means cooperable with one of said levers and said lever being shifted out of cooperable relationship with said cam means by said control means when the selector means is moved to "manual" position, said second setting device having cam means cooperable with the remaining lever for actuating the latter when the selector means is in the "manual" position, and in which the other driving connection means comprises a single lever, said first setting device having cam means cooperable with the single lever for actuating the latter when the selector means is in "automatic" position.

4. The invention as defined in claim 1, in which the second setting device comprises the selector means.

5. The invention as defined in claim 1, in which the control means include pawls, and in which the connection means include levers some of which are cooperable with said pawls to effect said disconnection of the first setting device, said pawls being disengaged from the said levers when the selector means is shifted from "manual" to "automatic" position.

References Cited in the file of this patent

UNITED STATES PATENTS

| | | |
|---|---|---|
| 2,949,070 | Frost | Aug. 16, 1960 |
| 2,993,425 | Rentschler | July 25, 1961 |